United States Patent
Mavrosakis et al.

(10) Patent No.: US 9,115,761 B2
(45) Date of Patent: Aug. 25, 2015

(54) BALL BEARING ASSEMBLY NOTIFICATION MECHANISM

(71) Applicant: Honeywell International Inc., Morristown, NJ (US)

(72) Inventors: Peter Mavrosakis, Lomita, CA (US); Voytek Kanigowski, Fountain Valley, CA (US)

(73) Assignee: Honeywell International Inc., Morristown, NJ (US)

( * ) Notice: Subject to any disclaimer, the term of this patent is extended or adjusted under 35 U.S.C. 154(b) by 123 days.

(21) Appl. No.: 13/908,537

(22) Filed: Jun. 3, 2013

(65) Prior Publication Data

US 2014/0358363 A1    Dec. 4, 2014

(51) Int. Cl.
| | |
|---|---|
| *G01M 17/00* | (2006.01) |
| *G06F 7/00* | (2006.01) |
| *F16C 33/58* | (2006.01) |
| *F16C 41/00* | (2006.01) |
| *G07C 5/00* | (2006.01) |
| *F16C 19/14* | (2006.01) |
| *F16C 19/52* | (2006.01) |
| *G01M 13/04* | (2006.01) |
| *F16C 19/18* | (2006.01) |

(52) U.S. Cl.
CPC ............. *F16C 33/585* (2013.01); *F16C 19/14* (2013.01); *F16C 19/52* (2013.01); *F16C 41/00* (2013.01); *F16C 41/008* (2013.01); *G01M 13/045* (2013.01); *G07C 5/00* (2013.01); *F16C 19/183* (2013.01); *F16C 2233/00* (2013.01)

(58) Field of Classification Search
None
See application file for complete search history.

(56) References Cited

U.S. PATENT DOCUMENTS

| | | | | |
|---|---|---|---|---|
| 3,897,116 | A * | 7/1975 | Carpenter | 384/297 |
| 4,063,786 | A * | 12/1977 | Rall | 384/448 |
| 4,790,190 | A * | 12/1988 | Bambara et al. | 73/660 |
| 4,834,400 | A * | 5/1989 | Lebeck | 277/399 |
| 5,029,477 | A * | 7/1991 | Bambara | 73/660 |
| 5,054,938 | A * | 10/1991 | Ide | 384/117 |
| 5,102,237 | A * | 4/1992 | Ide | 384/224 |
| 5,332,317 | A * | 7/1994 | Niwa et al. | 384/548 |
| 5,451,110 | A * | 9/1995 | Gams et al. | 384/624 |
| 5,511,422 | A * | 4/1996 | Hernandez | 73/593 |
| 5,855,110 | A * | 1/1999 | Bock et al. | 57/406 |
| 5,865,543 | A * | 2/1999 | MacLean | 384/448 |

(Continued)

FOREIGN PATENT DOCUMENTS

| | | |
|---|---|---|
| DE | 102008046357 A1 | 3/2010 |
| JP | 2007138974 A | 6/2007 |

(Continued)

OTHER PUBLICATIONS

EPO Extended Search Report of Oct. 29, 2014 re: European Patent Application No. EP 14 168 553.7 (9 pages).

*Primary Examiner* — Bhavesh V Amin
(74) *Attorney, Agent, or Firm* — Brian J. Pangrle

(57) ABSTRACT

A ball bearing assembly can include an outer race that includes an inner surface; an inner race that comprises an outer surface that includes an imperfection and a shoulder disposed at a shoulder angle where the imperfection is disposed at an angle in a range from about 50% of the shoulder angle to about 100% of the shoulder angle; and balls disposed between the inner surface of the outer race and the outer surface of the inner race. Various other examples of devices, assemblies, systems, methods, etc., are also disclosed.

16 Claims, 10 Drawing Sheets

(56) References Cited

U.S. PATENT DOCUMENTS

| | | | |
|---|---|---|---|
| 6,152,605 A | 11/2000 | Takemura et al. | |
| 6,161,962 A * | 12/2000 | French et al. | 384/459 |
| 6,367,978 B1 * | 4/2002 | Edwards | 384/490 |
| 6,370,957 B1 * | 4/2002 | Filippenko et al. | 73/660 |
| 6,808,179 B1 * | 10/2004 | Bhattacharyya et al. | 277/348 |
| 7,077,573 B2 * | 7/2006 | Suh et al. | 384/125 |
| 7,299,703 B2 * | 11/2007 | Balasu et al. | 73/810 |
| 7,401,982 B2 * | 7/2008 | Thompson | 384/613 |

FOREIGN PATENT DOCUMENTS

| | | |
|---|---|---|
| JP | 2012097823 A | 5/2012 |
| WO | 2012074867 A1 | 6/2012 |

* cited by examiner

910

920

930

940

BALL BEARING ASSEMBLY NOTIFICATION MECHANISM

TECHNICAL FIELD

Subject matter disclosed herein relates generally to ball bearing assemblies.

BACKGROUND

A turbocharger center housing rotating assembly (CHRA) can include a turbine wheel and a compressor wheel attached to a shaft rotatably supported by a ball bearing assembly located in a bore of a center housing. As an example, a ball bearing assembly (e.g., or ball bearing cartridge) can include an outer race and an inner race, configured to receive a shaft, where the outer race and the inner race are separated by balls. As another example, a shaft may be configured as an inner race, for example, where balls directly contact the shaft.

During operation of a turbocharger, axial loads can be generated that thrust the turbocharger shaft and associated components toward the compressor end or toward the turbine end of the turbocharger CHRA. Such loads may, over time, cause wear of one or more surfaces of a ball bearing assembly, which, in turn, may lead to a reduction in performance, failure, etc.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

During operation of a turbocharger, a ball bearing assembly may be exposed to imbalance forces, thrust forces, etc. Such forces can cause one or more surfaces of a ball bearing assembly to wear, which, in turn, may decrease performance, lead to failure, etc.

One or more balancing processes that aim to minimize imbalance may be performed on components of a turbocharger. For example, individual components may be balanced using a low rotational speed process while assemblies (e.g., center housing rotating assemblies or CHRAs) may be balanced using a higher rotational speed process. However, over the lifetime of a turbocharger, various phenomena can lead to imbalance (e.g., wear, coking, etc.).

As to thrust forces, these may arise during operational transients such as changes in demand, changes in geometry of a variable geometry turbine unit or compressor unit, etc. Operational transients may generate axial thrust forces that accelerate wear as components in a ball bearing assembly come closer together, for example, squeezing out or otherwise thinning lubricant film thickness between such components.

As with most types of machinery, a manufacturer may recommend inspection, servicing, replacement, etc. of a turbocharger, or one or more components therein, based on, for example, hours of use. However, from time-to-time, a turbocharger may fail even though such recommendations have been followed. Unexpected failure of a turbocharger can lead to unplanned downtime of equipment that relies on the turbocharger, which may have associated costs. For example, consider unplanned downtime due to unexpected failure of a turbocharger in a long-haul diesel semi-trailer truck carrying perishable cargo. In such a scenario, forewarning of a heightened risk of failure may have led to different types of planned uses for the truck, for example, shorter hauls with non-perishable cargo and, for example, planning of maintenance to repair or replace one or more components associated with the forewarning.

As described herein, a ball bearing assembly can include a notification mechanism, which may, for example, provide notice of wear or other status prior to failure. Such a mechanism may facilitate planning for repair, replacement, etc. and help to avoid unplanned downtime of equipment that may rely on the ball bearing assembly.

Below, an example of a turbocharged engine system is described followed by various examples of components, assemblies, methods, etc.

Figure 1:
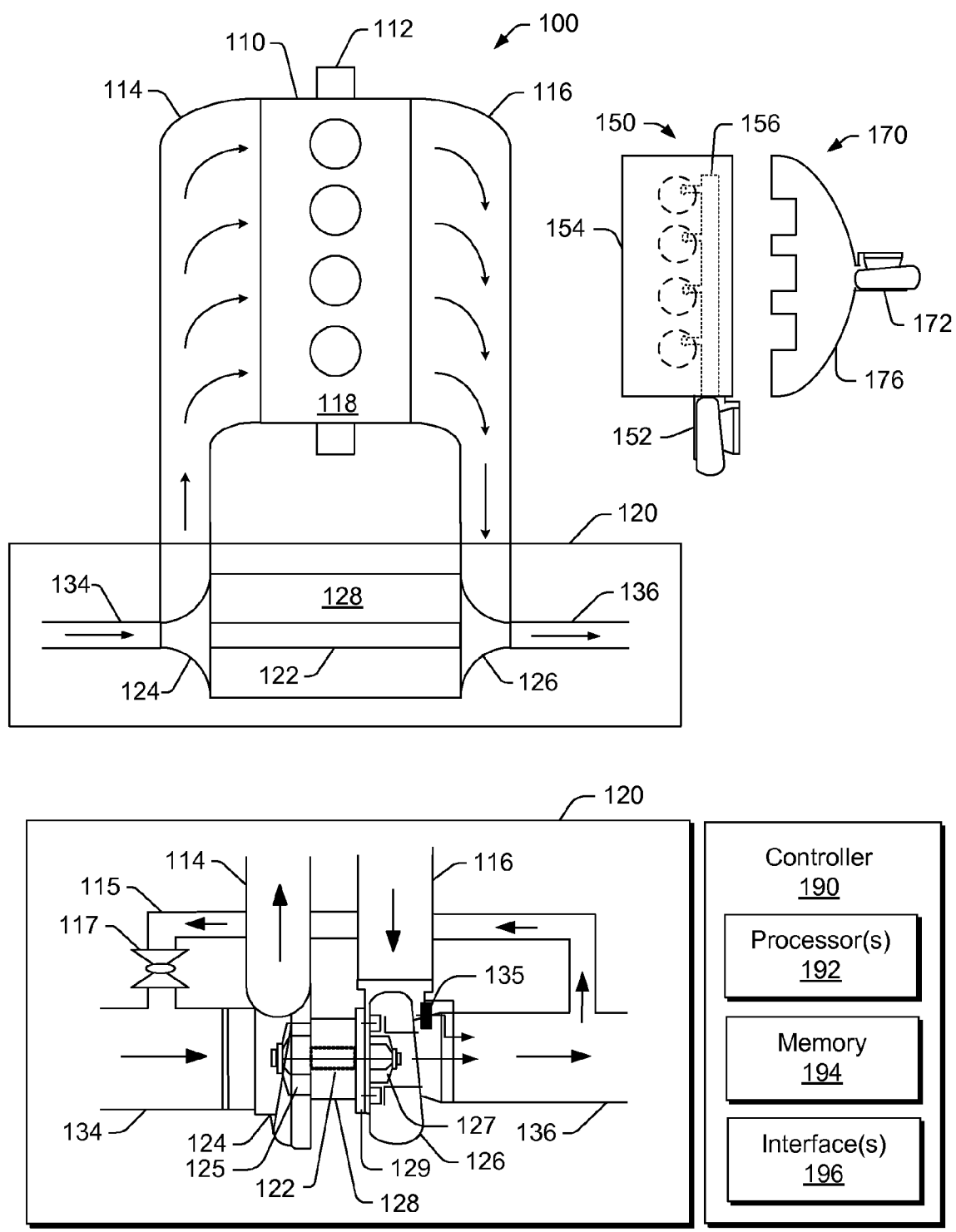
FIG. 1 is a diagram of a turbocharger and an internal combustion engine along with a controller.

Turbochargers are frequently utilized to increase output of an internal combustion engine. Referring to FIG. 1, a conventional system 100 includes an internal combustion engine 110 and a turbocharger 120. The internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor housing 124 for a compressor wheel 125, a turbine housing 126 for a turbine wheel 127, another housing 128 and an exhaust outlet 136. The housing 128 may be referred to as a center housing as it is disposed between the compressor housing 124 and the turbine housing 126. The shaft 122 may be a shaft assembly that includes a variety of components. The shaft 122 may be rotatably supported by a bearing system (e.g., journal bearing(s), ball bearing(s), etc.) disposed in the housing 128 (e.g., a bore defined by one or more bore walls) such that rotation of the turbine wheel 127 causes rotation of the compressor wheel 125 (e.g., as rotatably coupled by the shaft 122).

In the example of FIG. 1, a variable geometry assembly 129 is shown as being, in part, disposed between the housing 128 and the housing 126. Such an assembly may include vanes or other components to vary geometry of passages that lead to a turbine wheel space in the turbine housing 126. As an example, a variable geometry compressor unit may be provided.

In the example of FIG. 1, a wastegate valve (or simply wastegate) 135 is positioned proximate to the inlet of the turbine 126. The wastegate valve 135 can be controlled to allow exhaust from the exhaust port 116 to bypass the turbine 126. Further, an exhaust gas recirculation (EGR) conduit 115 may be provided, optionally with one or more valves 117, for example, to allow exhaust to flow to a position upstream the compressor wheel 125.

FIG. 1 also shows an example arrangement 150 for flow of exhaust to an exhaust turbine housing 152 and another example arrangement 170 for flow of exhaust to an exhaust turbine housing 172. In the arrangement 150, a cylinder head 154 includes passages within to direct exhaust from cylinders to the turbine housing 152 while in the arrangement 170, a manifold 176 provides for mounting of the housing 172, for example, without any separate, intermediate length of exhaust piping. In the example arrangements 150 and 170, the turbine housings 152 and 172 may be configured for use with a variable geometry assembly such as the assembly 129 or, for example, other assemblies described herein.

In FIG. 1, an example of a controller 190 is shown as including one or more processors 192, memory 194 and one or more interfaces 196. Such a controller may include circuitry such as circuitry of an engine control unit. As described herein, various methods or techniques may optionally be implemented in conjunction with a controller, for example, through control logic. Control logic may depend on one or more engine operating conditions (e.g., hours of service, turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate, an electric motor, or one or more other components associated with an engine, a turbocharger (or turbochargers), etc. As an example, the controller 190 may be configured to perform a method associated with a ball bearing assembly, for example, a method that can issue a notification responsive to noise generated by a ball bearing assembly (e.g., due to an imperfection built into the ball bearing assembly).

Figure 2:
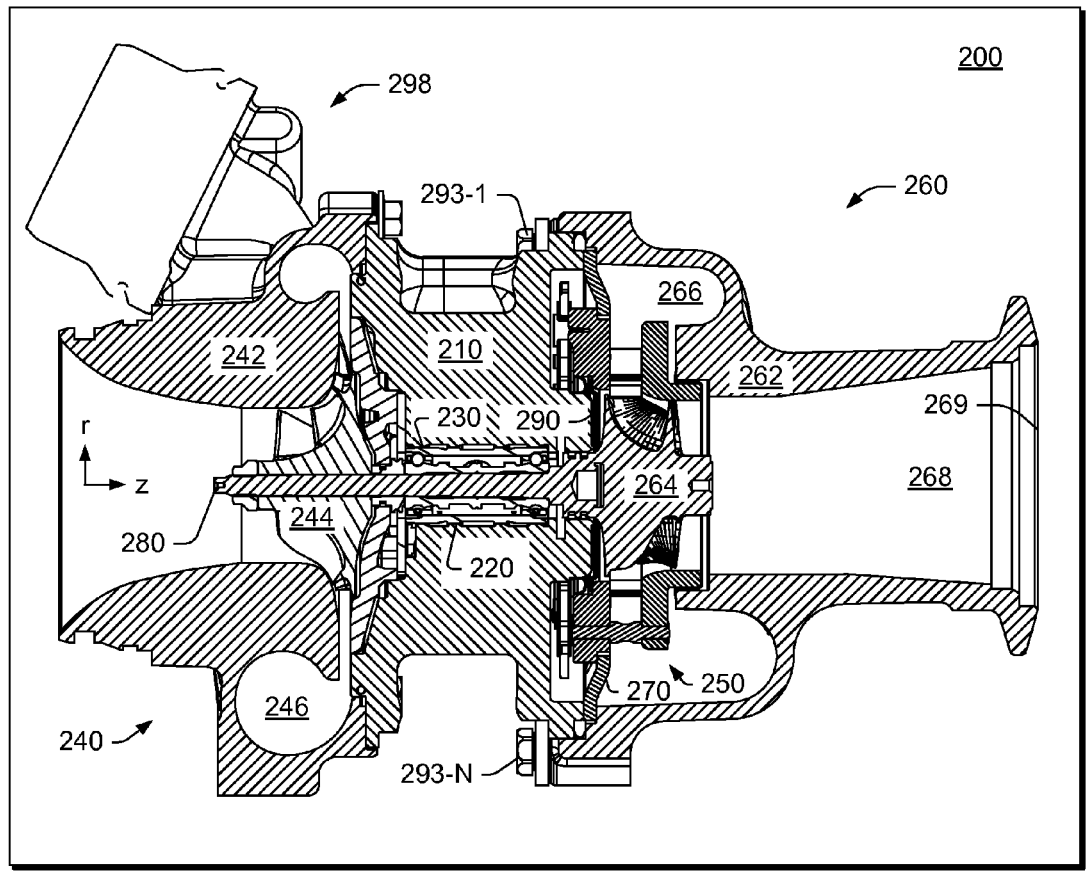
FIG. 2 is a cross-sectional view of an example of a turbocharger assembly.

FIG. 2 shows an example of a turbocharger assembly 200 that includes a ball bearing assembly 220 (e.g., a ball bearing cartridge) disposed in a bore 230 (e.g., a through bore defined by one or more bore walls) of a housing 210 between a compressor assembly 240 and a turbine assembly 260 where the ball bearing assembly 220 supports a shaft 280. In the example of FIG. 2, the compressor assembly 240 includes a compressor housing 242 that defines a volute 246 and that houses a compressor wheel 244 and the turbine assembly 260 includes a turbine housing 262 that defines a volute 266 and that houses a turbine wheel 264. The turbine wheel 264 may be, for example, welded or otherwise attached to the shaft 280 to form a shaft and wheel assembly ("SWA") where a free end of the shaft 280 allows for attachment of the compressor wheel 244.

In the example of FIG. 2, the turbine assembly 260 further includes a variable geometry assembly 250 (e.g., a VGT or VNT cartridge or unit) that is positioned using a flange 270 (e.g., optionally shaped as a stepped annular disc) that clamps between the housing 210 and the turbine housing 262, for example, using bolts 293-1 to 293-N and a heat shield 290 (e.g., optionally shaped as a stepped annular disc), the latter of which is disposed between the cartridge 250 and the housing 280.

As to exhaust flow, higher pressure exhaust in the volute 266 passes through passages of the cartridge 250 to reach the turbine wheel 264 as disposed in a turbine wheel space defined by the cartridge 250 and the turbine housing 262. After passing through the turbine wheel space, exhaust travels axially outwardly along a passage 268 defined by a wall of the turbine housing 262 that also defines an opening 269 (e.g., an exhaust outlet). The exhaust may then flow to an exhaust system, which may optionally include one or more emissions components, etc. and then to an external environment (e.g., at atmospheric pressure).

During operation of the turbocharger assembly 200, adjustments to geometry of the variable geometry assembly 250 may generate thrust forces, which may, for example, cause shifts in clearances between one or more components. As an example, a test regimen may be performed by adjusting geometry of a variable geometry assembly 250, for example, to cause a shift in clearances, positions, etc. of one or more components of the ball bearing assembly 220. In such an example, the test regimen may test a notification mechanism of the ball bearing assembly 220.

In FIG. 2, as well as in other figures, various components may be described, for example, with respect to a cylindrical coordinate system having radial, axial and azimuthal coordinates r, z and $\Theta$, respectively.

Figure 3:
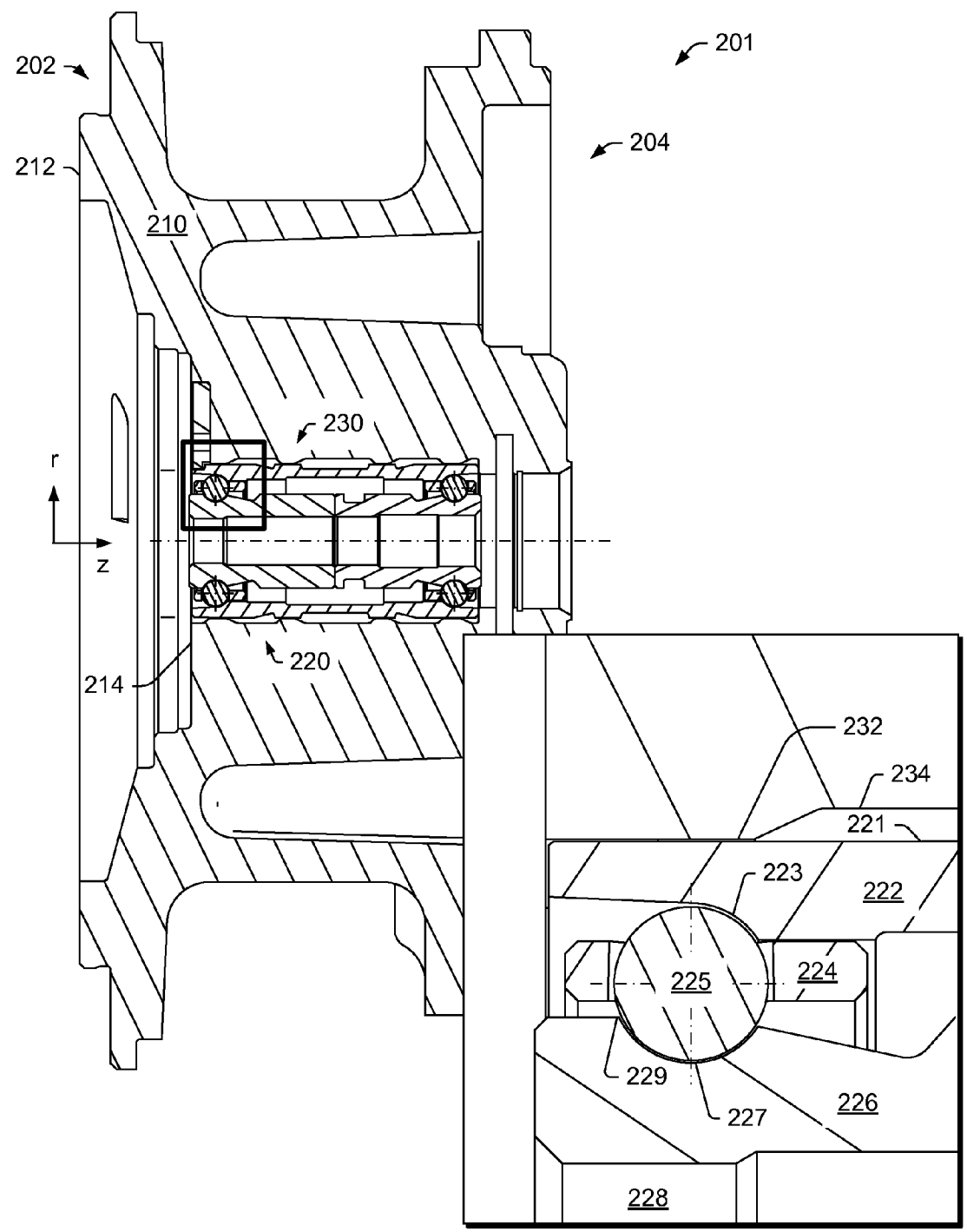
FIG. 3 is a series of cross-sectional views of an example of a housing assembly.

FIG. 3 shows a cross-sectional view of a housing assembly 201 of the turbocharger assembly 200 of FIG. 2 along with an enlarged view of a portion of the housing assembly 201. As shown, the housing 210 includes a compressor side 202 and a turbine side 204 where the compressor side 202 includes an axial face 212 and a recessed axial face 214 to which the bore 230 opens.

As shown in the enlarged view of FIG. 3, the ball bearing assembly 220 includes an outer race 222 with an outer surface 221 and an inner surface 223 and an inner race 226 with an outer surface 227 and an inner surface 228. In the example of FIG. 3, balls 225 are disposed between the outer race 222 and the inner race 226 as well as disposed within openings of a ball separator 224 (e.g., a ring with openings). As an example, the inner surface 228 of the inner race 226 may have a diameter sized to achieve a press-fit (e.g., interference fit) onto a shaft (see, e.g., the shaft 280 of FIG. 2). As an example, the inner race 226 and the outer race 222 may be made of metal such as steel and the balls 225 may be made of metal or ceramic.

The example of FIG. 3 also shows the housing 210 as including the bore 230 with bore surfaces 232 and 234, for example, where the surface 221 of the outer race 222 can form a clearance with the bore surface 232 and can form a larger clearance with the bore surface 234 (e.g., for flow of lubricant).

In the example of FIG. 3, the balls 225 are retained within the ball bearing assembly 220, in part, by a shoulder 229 of the outer surface 227 of the inner race 226. The shoulder 229 may be considered a demarcation point of useable versus non-useable raceway material of the inner race 226. During operation, when a ball contact angle reaches the shoulder 229, the condition may be referred to as "land override" (e.g., a portion outside the raceway may be considered a "land"). Depending on clearances, etc., land override may result in balls moving axially outwardly, poor performance, failure, etc. As an example, land override may result in one or more balls being ejected from a ball bearing assembly.

As mentioned, imbalance forces, thrust forces, etc. may increase wear of a ball bearing assembly. For example, axially directed thrust forces may cause a reduction in clearance between the outer surface 227 of the inner race 226 and the balls 225 as well as riding up of the balls 225 in a raceway toward the shoulder 229. During operation, imbalance and/or other forces may also act to cause riding up of the balls 225 toward the shoulder 229. Such forces may be dependent, at least in part, on rotational speed, for example, where an increase in rotational speed causes riding up of the balls toward the shoulder 229 (e.g., centripetal force, etc.). As an example, an adjustment to geometry of a variable geometry unit may result in an increase in rotational speed. As described herein, such an adjustment may be responsive to demand or, for example, part of a test regimen (e.g., where the test regimen may mimic the demand).

Figure 4:
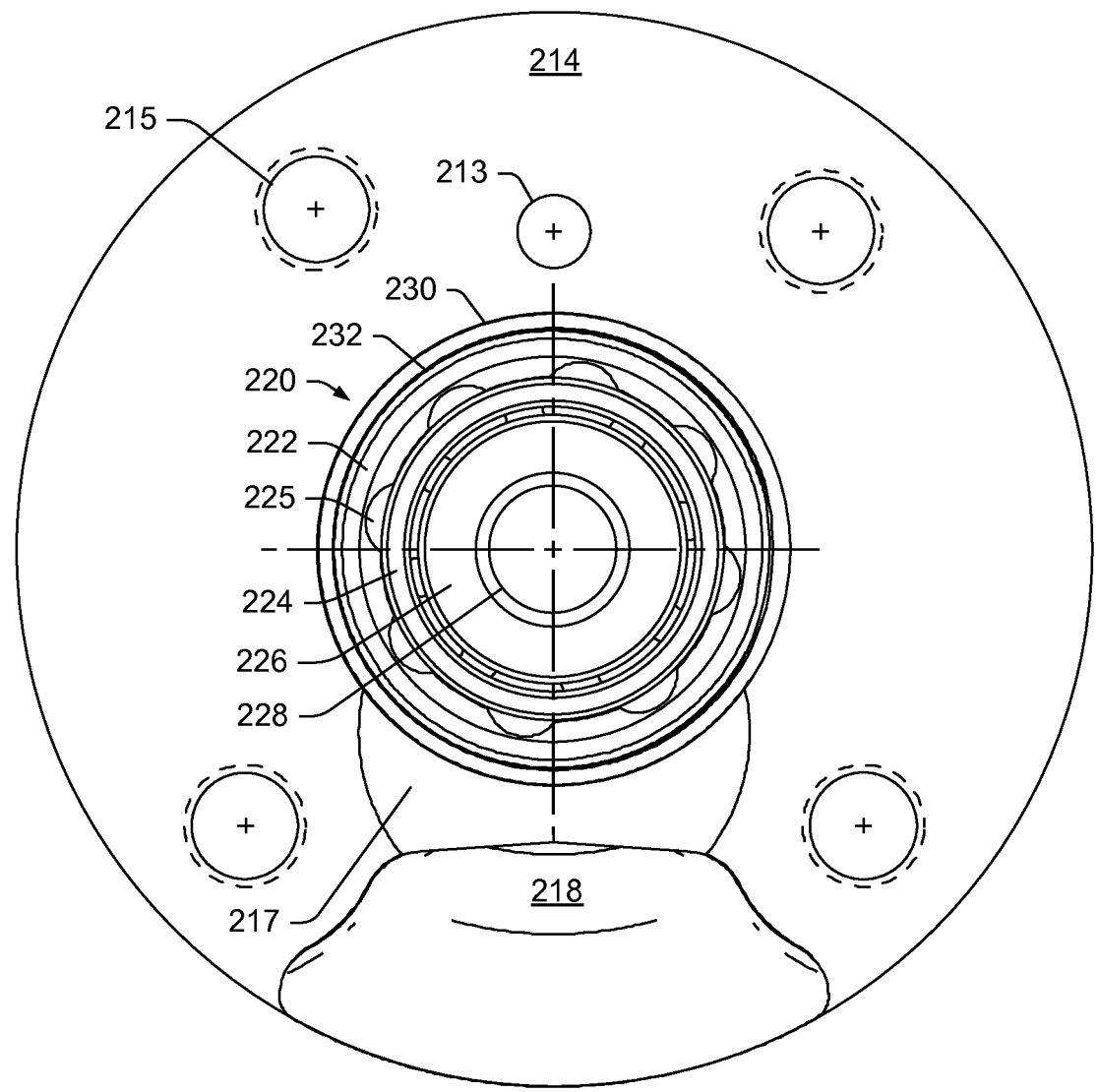
FIG. 4 is a plan view of the housing assembly of FIG. 3.

FIG. 4 shows a compressor end view of a portion of the housing assembly 201 of FIG. 3. In the example of FIG. 4, during operation, lubricant may lubricate various surfaces and, for example, flow to a drain recess 217 and to a lubricant drainage chamber 218 of the housing 210. Also shown in FIG. 4 are bores for receipt of bolts or other components, for example, to attach a compressor back plate to the housing 210 (see, e.g., the turbocharger assembly 200 of FIG. 2).

Figure 5:
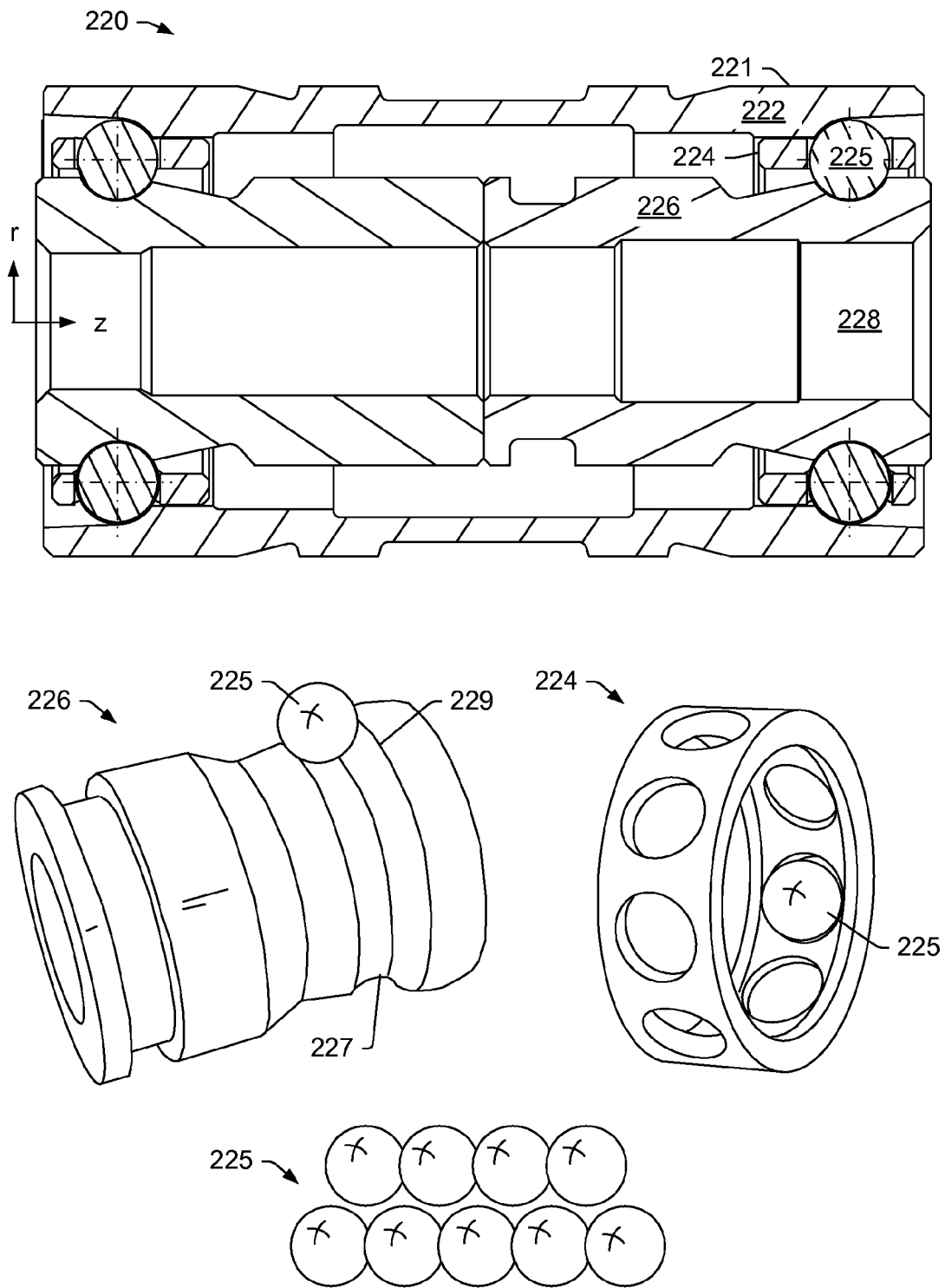
FIG. 5 is a cross-sectional view of an example of a ball bearing assembly and various perspective views of examples of some components of the ball bearing assembly.

FIG. 5 shows a cross-sectional view of the ball bearing assembly 220, which may include a two piece inner race and a unitary outer race. In the example of FIG. 5, the inner race 226 may be considered a compressor side or a turbine side inner race, noting that features described with respect to the inner race 226 may be present on both pieces of the two piece inner race.

FIG. 5 also shows perspective views of the inner race 226, the ball separator 224 and the balls 225. A ball bearing assembly may include any number of balls, for example, generally more than about 4 balls; noting that the example of FIG. 5 shows nine balls 225, which may be guided by nine openings in the ball separator 224.

Figure 6:
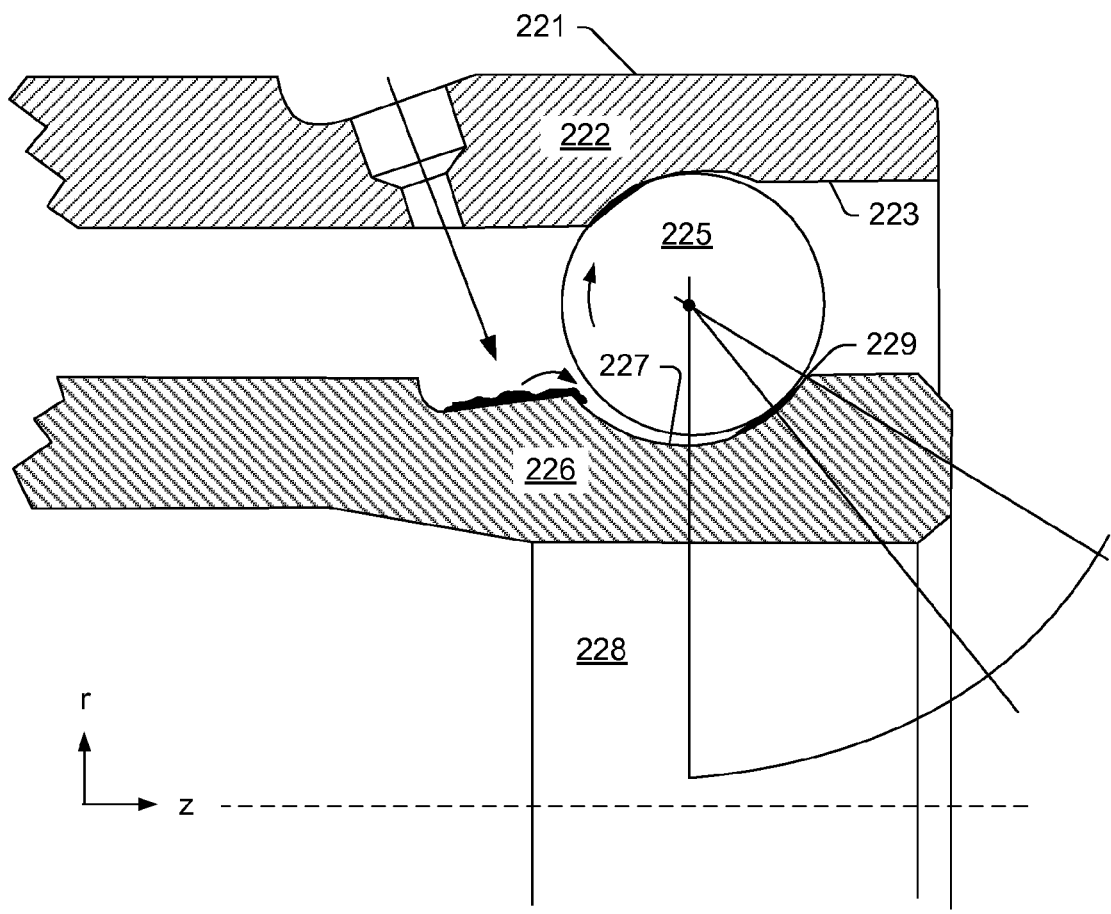
FIG. 6 is a cross-sectional view of a portion of a ball bearing assembly.

FIG. 6 shows a cross-sectional view of a portion of the ball bearing assembly 220 along with a shoulder angle for the shoulder 229, which may be describes as being a "high" shoulder with respect to another shoulder of the surface 227 (e.g., a shoulder located axially and radially inwardly from the shoulder 229). As shown in the example of FIG. 6, the ball bearing assembly 220 includes a lubricant passage for flow of lubricant (e.g., a lubricant jet) to ball bearings such as the ball 225. During operation, lubricant may be distributed about the ball 225 and form lubricant films between the ball 225 and the inner surface 223 of the outer race 222 and the outer surface 227 of the inner race 226.

As an example, a ball may form a contact angle with respect to an outer surface of an inner race, an inner surface of an outer race, etc. where "contact" may include a thin layer of lubricant between a ball and a surface. In the example of FIG. 6, the ball 225 is shown as having a contact angle with respect to the outer surface 227 of the inner race 226 that is less than the shoulder angle of the shoulder 229 of the inner race 226. During operation, the ball 225 may move in a raceway defined by the outer surface 227 of the inner race 226 and the inner surface 223 of the outer race 222 in a manner that changes the contact angle of the ball 225 with respect to the inner race 226 or the outer race 222 or that changes contact angles of the ball 225 with respect to the inner race 226 and the outer race 222.

As an example, the ball bearing assembly 220 may be configured with a normal operating range for the ball 225, which may be defined as a range of contact angles. For example, a normal operating range may include contact angles that are less than the shoulder angle of the shoulder 229 (e.g., by a number of degrees, etc.). In other words, the shoulder 229 may be at an angle that is specified to provide a safety margin. For example, where the shoulder 229 is at a shoulder angle of about 50 degrees, the normal operating range for the ball 225 may be, in terms of contact angle, up to about 40 degrees.

Figure 7:
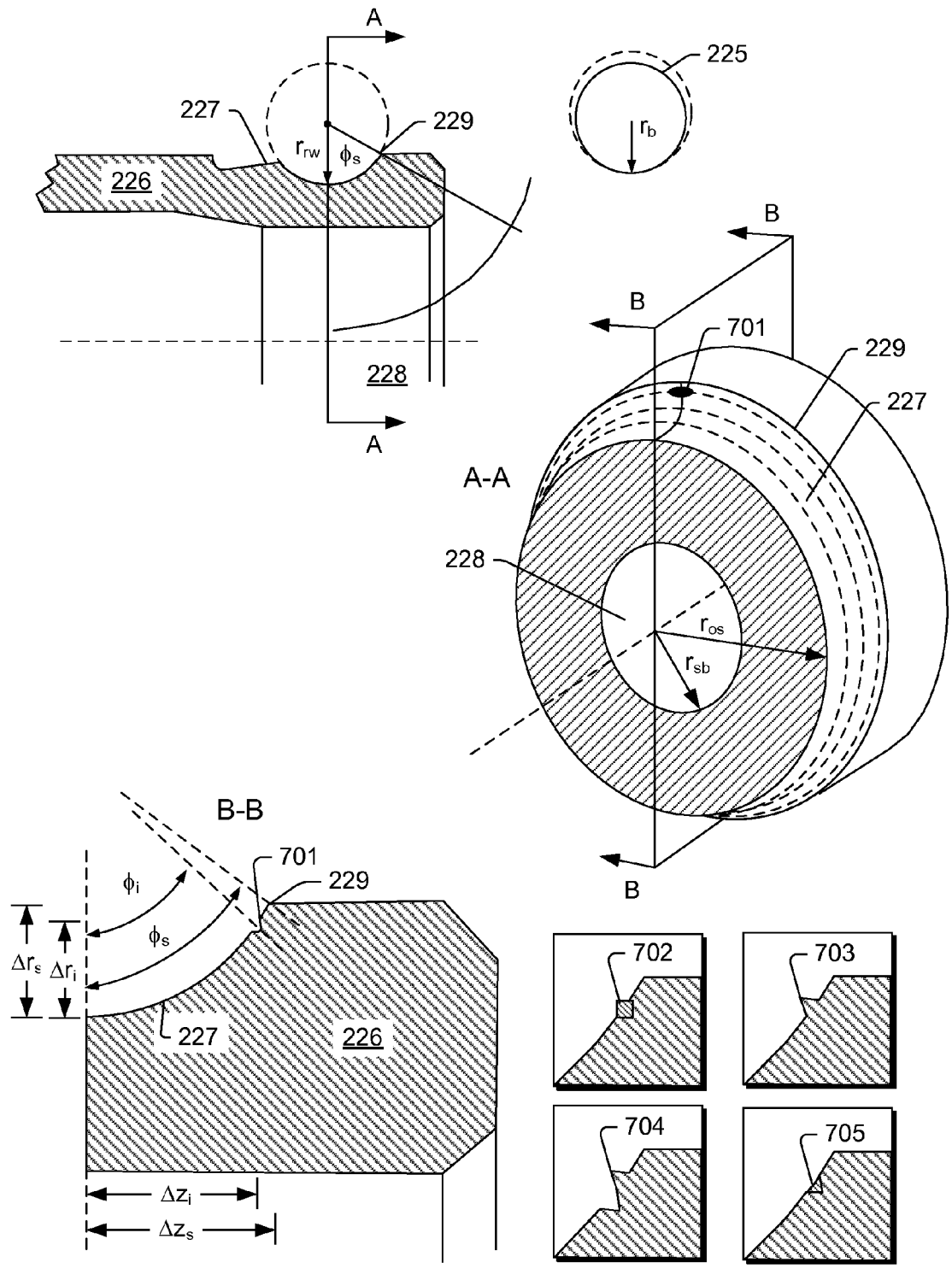
FIG. 7 is a series of views of examples of a ball bearing assembly component that includes an imperfection and a series of views of examples of imperfections.

FIG. 7 shows various cross-sectional views of the inner race 226 where the outer surface 227 of the inner race 226 includes an imperfection 701 that is located at an angle that is less than the shoulder angle of the shoulder 229. In such an example, if the ball 225 rides up toward the shoulder 229, it may contact the imperfection 701 as the ball 225 rotates about the inner race 226. As an example, such contact may generate noise (e.g., acoustic energy, acoustic waves, etc.), which may be in an audible range (e.g., 20 Hz to 20 kHz) or another range, for example, detectable by a sensor (e.g., a vibration or other type of sensor). In either instance, detected noise may serve as a notice of an increased risk of failure, a notice of hours remaining before servicing, a notice of passing or failure of a test regimen, etc.

In the cross-sectional view in the upper left of FIG. 7, the outer surface 227 of the inner race 226 is shown as including a raceway portion that may be approximately defined by a radius $r_{rw}$ where the raceway portion terminates at the high shoulder 229, which is disposed at a shoulder $\phi_s$. The ball 225 is also shown as being defined by a radius $r_b$, which may be smaller than the radius $r_{bs}$.

In the cross-sectional view in the middle right of FIG. 7, the inner race 226 is shown as being cut by a plane along a line A-A. As shown, the inner race 226 may be defined as including a shaft bore radius $r_{sb}$ and an outer surface radius $r_{os}$, which may be a minimum radius of the raceway portion of the outer surface 227 of the inner race 226. A series of dashed lines are shown to indicate various angles that lie in a range of angles between 0 degrees and the shoulder angle $\phi_s$ where the imperfection 701, which is built into the inner race 226 prior to assembly of the inner race 226 into a ball bearing assembly, is located at the highest angle, which is less than the shoulder angle $\phi_s$. As an example, a "land" portion may extend axially outwardly from the raceway, for example, at the shoulder angle $\phi_s$. As an example, a land portion may be disposed at an approximately constant diameter over an axial length of the inner race 226 (e.g., between a raceway and an end of an inner race).

In the cross-sectional view in the lower left of FIG. 7, a portion of the inner race 226 is shown as being cut by a plane along a line B-B. As shown, the imperfection 701 may be defined with respect to one or more dimensions. For example, the imperfection 701 may be defined with respect to an angle $\phi_i$, a radial position $\Delta r_i$ and/or an axial position $\Delta z_i$; noting that corresponding dimensions (e.g., angle $\phi_s$, radial position $\Delta r_s$ and axial position $\Delta z_s$) are also shown for the shoulder 229. In the example of FIG. 7, the outer surface 227 of the inner race 226 has an approximately constant radius between the shoulder 229 and an axial end of the inner race 226, which may be a turbine end or a compressor end of the inner race 226.

FIG. 7 also shows various cross-sectional views of examples of imperfections 702, 703, 704 and 705. The imperfection 702 includes a material seated in a seat in an outer surface of an inner race that extends outwardly from the outer surface forming a raised surface, the imperfection 703 includes a raised surface, the imperfection 704 includes a raised surface and a recessed surface, and the imperfection 705 includes a material seated in a seat in an outer surface of an inner race that may, for example, be a softer material than the material forming the inner race that may wear more readily than the material forming the inner race to form a recess in the outer surface of the inner race. In such an example, the softer material may be a polymeric material, a metal material, a composite material, etc. and, for example, the inner race may be made of a metal material (e.g., steel, alloy, etc.). As an example, a material may wear to reduce size of an imperfection and, for example, noise generated by the imperfection. For example, upon initial contact between balls and an imperfection, acoustic energy may be generated as a notification and, upon wear of the imperfection, the acoustic energy generated may less and, for example, become less noticeable. As an example, a series of imperfections may be provided where each of the imperfections can generate noise upon contact with balls of a ball bearing assembly to indicate different levels of risk or states of the ball bearing assembly. In such an example, one or more of the imperfections may optionally diminish over time (e.g., responsive to contact with balls). As an example, an imperfection may be a void where wear increases exposed size of the void. For example, consider a spherical void in a material where only a portion of the void is exposed and where wear of the material exposes a larger portion of the void (e.g., to increase the void perimeter), which may, for example, alter noise generated by balls of a ball bearing assembly as they interact with the void (e.g., perimeter, edges, etc. of the material).

As an example, an outer surface of an inner race (e.g., a raceway portion) may include an imperfection that rises above the outer surface and an imperfection that recesses below the outer surface. As an example, an indent may plastically yield material of an inner race to create a "negative" while also displacing material of the inner race to create a "positive" (e.g., akin to an indentation hardness tester).

As an example, a ball bearing assembly can include an outer race that includes an inner surface; an inner race that includes an outer surface that includes an imperfection and a shoulder disposed at a shoulder angle where the imperfection is disposed at an angle in a range from about 50% of the shoulder angle to about 100% of the shoulder angle; and balls disposed between the inner surface of the outer race and the outer surface of the inner race.

Figure 8:
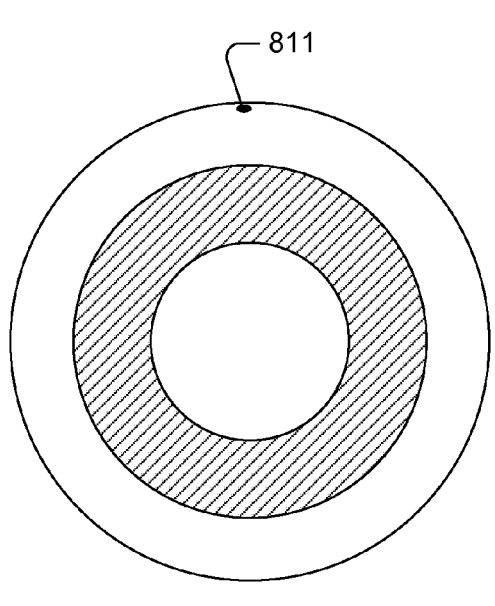
FIG. 8 is a series of cross-sectional views of examples of imperfections.
Figure 8:
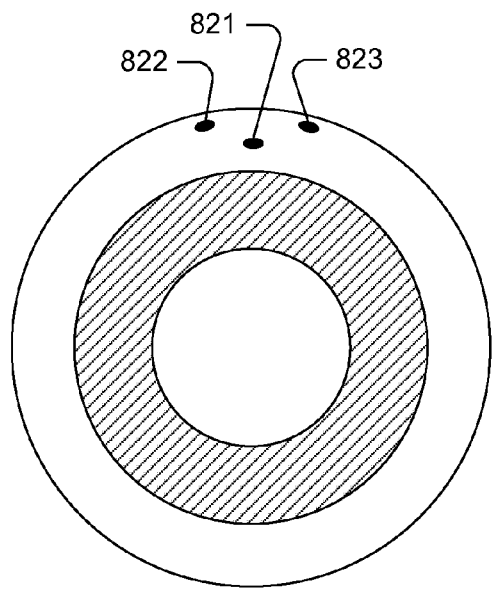
Figure 8:
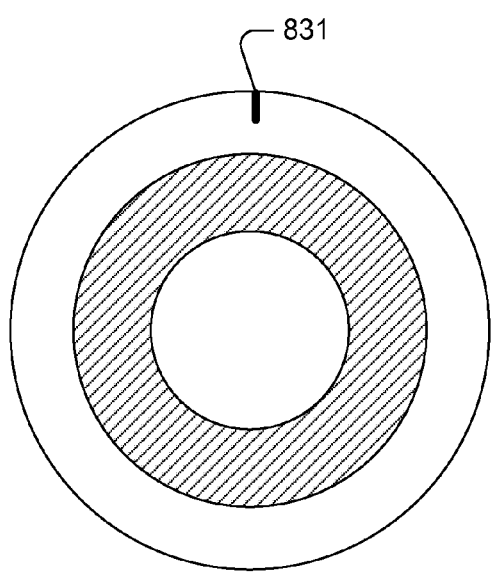
Figure 8:
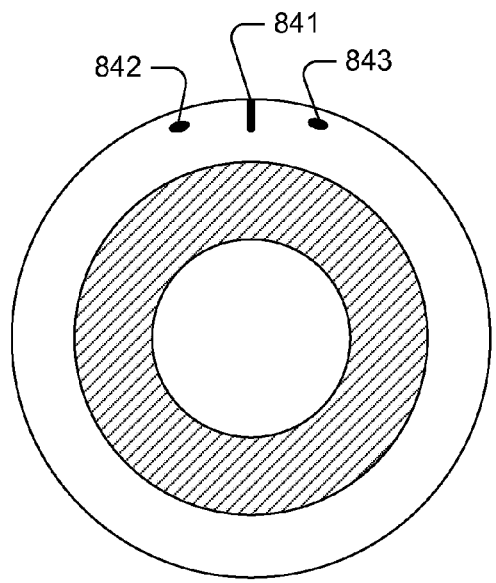

FIG. 8 shows examples of inner races 810, 820, 830 and 840 that include one or more imperfections. For example, the inner race 810 includes an imperfection 811; the inner race 820 includes imperfections 821, 822 and 823; the inner race 830 includes an imperfection 831; and the inner race 840 includes imperfections 841, 842 and 843. While the imperfections shown in FIG. 8 appear as relatively discrete imperfections, an imperfection may optionally be made as a surface treatment, for example, by imparting a surface roughness to a portion of an outer surface of an inner race such that contact between a ball and the roughened portion of the outer surface generates acoustic energy that may be detected, classified, etc. (e.g., for purposes of notification).

As an example, an inner race may include one or more imperfections to generate acoustic energy upon contact with balls (e.g., acoustic energy that differs in one or more characteristics compared to no such imperfection(s)). As an example, the generated acoustic energy may be at one or more frequencies for a given rotational speed of the balls about an inner race, which may be fit to a shaft or may be a shaft. As an example, the shape, depth, spacing, etc. of one or more imperfections may be selected based on an analysis of operating conditions for a turbocharger. Such an analysis may select one or more imperfection parameters for purposes of generating acoustic energy in an audible range (e.g., within a range of about 100 Hz to about 1000 Hz). As an example, the range may be audible to an operator of a vehicle that includes an internal combustion engine to which a turbocharger is fitted such that the one or more imperfections are part of a notification mechanism to notify the operator as to status of a ball bearing assembly or one or more components therein. As an example, a notification mechanism may include an amplifier that amplifies sound. As an example, such a mechanism may be triggered upon detection of one or more frequencies, amplitudes, etc. to increase gain, to switch a circuit to a speaker, etc.

As an example, an imperfection may be built into an inner race of a ball bearing assembly of a turbocharger proximate to a high shoulder of a raceway portion of the inner race. In such an example, where balls tend to ride up toward the high shoulder responsive to axial thrust, high shaft rpm, etc. of the turbocharger, contact between the balls and the imperfection may generate acoustic energy within an approximate range of frequencies where, for example, in a steady-state, the acoustic energy may vary with respect to time with a dominant frequency. In such an example, the dominant frequency may be an audible frequency, for example, audible to an operator of a vehicle, a mechanic, etc. In response, the operator, mechanic, etc. may service, plan to service, etc. the turbocharger.

As an example, an inner race on a compressor side of a ball bearing assembly may include one or more imperfections that differ from one or more imperfections on an inner race of a turbine side of a ball bearing assembly. In such an example, acoustic energy generated by contact between balls and the imperfections may differ such that compressor side and turbine side contact may be distinguished. As an example, a ball bearing assembly may include a unitary outer race that serves both a compressor side inner race and a turbine side inner race, for example, where one or both inner races include at least one imperfection. As an example, a ball bearing assembly may be provided for a compressor side with a set of balls between an outer race and an inner race and another ball bearing assembly may be provided for a turbine side with a set of balls between an outer race and an inner race, for example, where either or both ball bearing assemblies may include at least one imperfection.

Figure 9:
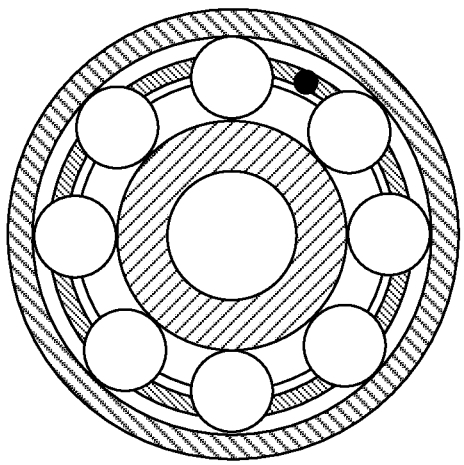
FIG. 9 is a series of views of ball bearing assemblies with different classes of imperfections.
Figure 9:
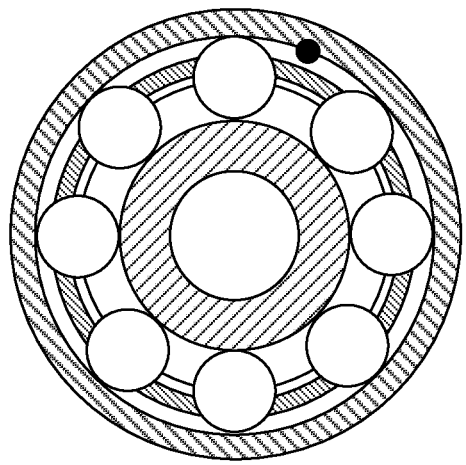
Figure 9:
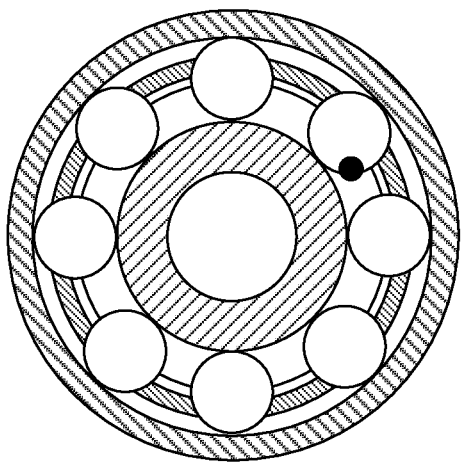
Figure 9:
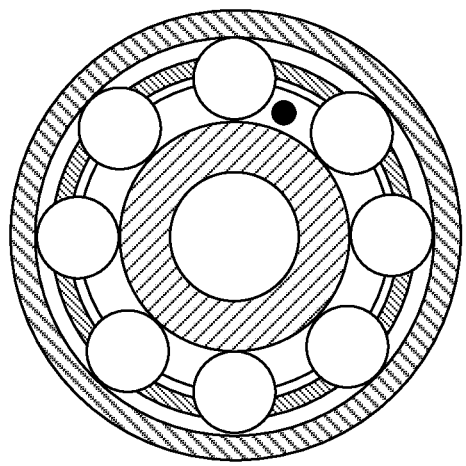

FIG. 9 shows various example scenarios 910, 920, 930 and 940 for a ball bearing assembly. In the scenario 910, noise may be generated due to imbalance in a ball separator (e.g., due to an imperfection, etc.); in the scenario 920, noise may be generated due to an imperfection in an outer race; in the scenario 930, noise may be generated due to an imperfection in a ball; and in the scenario 940, noise may be generated due to an imperfection in an inner race.

As an example, the various scenarios of FIG. 9 may generate noise that can be classified, for example, according to a classification scheme. Such a scheme may rely on model, data or a combination of models and data. For example, a model may model physics of an imperfection in conjunction with one or more operational conditions of a turbocharger (e.g., speed, demand, geometry, wastegating, etc.).

As an example, a turbocharger assembly may include one or more sensors and associated circuitry for sensing and analyzing noise. Such circuitry may further be configured, for example, for classifying noise (e.g., based on sensing and an analysis of sensed information). As an example, such circuitry may be configured to amplify noise, optionally including processing one or more signals (e.g., via one or more filters, etc.).

Figure 10:
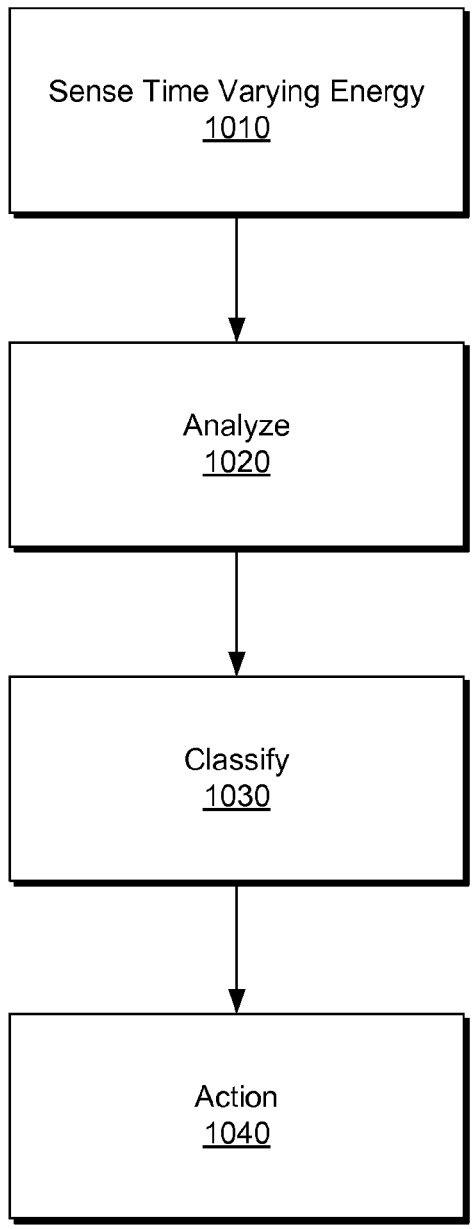
FIG. 10 is a block diagram of an example of a method.
Figure 10:
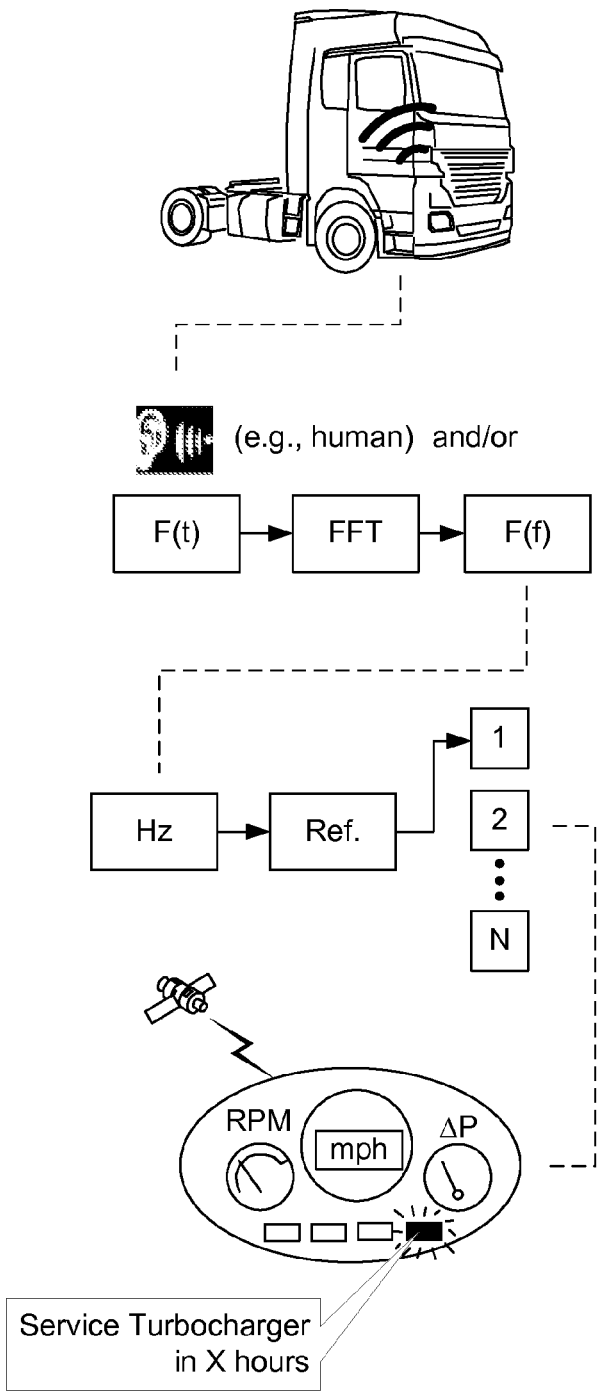

FIG. 10 shows an example of a method 1000 that includes a sense block 1010 for sensing time varying energy, an analysis block 1020 for analyzing sensed energy, a classification block 1030 for classifying sensed energy (e.g., analyzed sensed energy) and an action block 1040 for taking one or more actions responsive to the sensing, analyzing and/or classifying of the blocks 1010, 1020 and 1030. As an example, an action can include issuing a notification (e.g., via a light, a buzzer, an error code, an electronically transmitted message, etc.).

As an example, an analysis may be or include human analysis, for example, where an operator, mechanic, etc. hears an audible sound indicative of contact between balls of a ball bearing assembly and one or more imperfections built into a surface or surfaces of the ball bearing assembly. In such an example, a human may respond via notifying another (e.g., a servicing system, mechanic, etc.) and may optionally classify the audible sound (e.g. or sounds). As an example, a vehicle may include a notification button or other user activatable mechanism for use by a user responsive to detection of audible sound. For example, such a button or mechanism may generate an error code, issue a signal, commence a test regimen, etc.

As an example, an analysis may include a Fourier transform (e.g., DFT, FFT, etc.) algorithm to transform a time-varying energy signal (e.g., amplitude) from a time domain to a frequency domain. Such an analysis may reveal one or more frequencies (e.g., and optionally an associated amplitude) that may be compared to a classification index of a classification scheme (e.g., reference data). Such a comparison may identify a revealed frequency as being associated with a condition, for example, a ball contacting an imperfection or imperfections (e.g., of an inner race).

As an example, a vehicle may include one or more sensors to sense acoustic energy, circuitry to analyze the sensed acoustic energy and circuitry to respond to such an analysis to issue a notification. For example, the vehicle may include an instrument cluster that includes a warning light that illuminates responsive to issuance of a notification signal (e.g., as part of a notification mechanism). As an example, a notification signal may be communicated via wireless communication circuitry (e.g., radio, cellular, satellite, etc.). As an example, a communicated notification signal may be received and input to a scheduling algorithm, for example, to schedule servicing, schedule use, etc. of a vehicle.

As an example, a vehicle may include gauges for engine rpm, boot pressure of a turbocharger, etc. and a service light (or other service indicator) that indicates a service status based at least in part on sensed acoustic energy from a ball bearing assembly of the turbocharger. As an example, a vehicle may include an engine fitted with multiple turbochargers where each of the turbochargers may include a ball bearing assembly that includes at least one built-in imperfection as part of a notification mechanism.

As an example, the controller 190 of FIG. 1 may include circuitry to perform one or more actions described herein. For example, the controller 190 of FIG. 1 may be configured to perform one or more of the functions associated with the blocks 1010, 1020, 1030 and 1040 of the method 1000 of FIG. 10.

As an example, a ball bearing assembly can include an outer race that includes an inner surface; an inner race that includes an outer surface that includes an imperfection and a shoulder disposed at a shoulder angle where the imperfection is disposed at an angle in a range from about 50% of the shoulder angle to about 100% of the shoulder angle; and balls disposed between the inner surface of the outer race and the outer surface of the inner race. In such an example, the imperfection may be a deviation in the outer surface of the inner race such as, for example, a raised deviation, a recessed deviation or a raised and recessed deviation. As an example, an imperfection may be a surface roughness of the outer surface of the inner race (e.g., optionally spanning an azimuthal angle, etc.). As an example, an imperfection may be part of a notification mechanism, for example, where the notification mechanism generates an audible notice responsive to contact between balls and the imperfection of an outer surface of an inner race.

As an example, a ball bearing assembly may include from about 5 to about 15 balls. As an example, an outer race may be a unitary outer race (e.g., optionally with a turbine side and a compressor side). As an example, an inner race may be a turbine side or a compressor side inner race As an example, a ball bearing assembly can include an outer race that includes an inner surface; a first inner race that includes an outer surface that includes an imperfection and a shoulder disposed at a shoulder angle where the imperfection is disposed at an angle in a range from about 50% of the shoulder angle to about 100% of the shoulder angle; a second inner race that includes an outer surface that includes an imperfection and a shoulder disposed at a shoulder angle where the imperfection is disposed at an angle in a range from about 50% of the shoulder angle to about 100% of the shoulder angle; a first set of balls disposed between the inner surface of the outer race and the outer surface of the first inner race; and a second set of balls disposed between the inner surface of the outer race and the outer surface of the second inner race. In such an example, for a given rotational speed of the inner races, the imperfection of the first inner race may generate a first frequency upon contact with the first set of balls and the imperfection of the second inner race may generate a second frequency upon contact with the second set of balls. In such an example, the first frequency may differ from the second frequency.

As an example, an imperfection of a first inner race may include a deviation in an outer surface of the first inner race where the deviation may be, for example, a raised deviation, a recessed deviation or a raised and recessed deviation. As an example, an imperfection of a second inner race may include a deviation in an outer surface of the second inner race where the deviation may be, for example, a raised deviation, a recessed deviation or a raised and recessed deviation.

As an example, a system can include a turbocharger that includes a ball bearing assembly that includes balls and an imperfection; a sensor to sense acoustic energy; and circuitry to issue a notification based at least in part on sensed acoustic energy being generated by at least some of the balls contacting the imperfection. In such a system, the imperfection may be an imperfection in an outer surface of an inner race of the ball bearing assembly. As an example, an outer surface of an inner race may be an outer surface of a shaft.

As an example, an imperfection may be an imperfection in an inner surface of an outer race of the ball bearing assembly, an imperfection in a ball separator that guides at least some of balls, or an imperfection in one of a set of balls.

As an example, a system may include a variable geometry unit and circuitry to implement a test regimen by adjusting the variable geometry unit. As an example, a system may include a wastegate and circuitry to implement a test regimen by adjusting the wastegate. As an example, a system may include a variable geometry unit and a wastegate.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A system comprising:
a turbocharger that comprises a ball bearing assembly that comprises balls and an imperfection;
a sensor to sense acoustic energy; and
circuitry to issue a notification based at least in part on sensed acoustic energy being generated by at least some of the balls contacting the imperfection.

2. The system of claim 1 wherein the imperfection comprises an imperfection in an outer surface of an inner race of the ball bearing assembly.

3. The system of claim 2 wherein the outer surface of the inner race comprises an outer surface of a shaft.

4. The system of claim 1 wherein the imperfection comprises an imperfection in an inner surface of an outer race of the ball bearing assembly.

5. The system of claim 1 wherein the imperfection comprises an imperfection in a ball separator that guides at least some of the balls.

6. The system of claim 1 wherein the imperfection comprises an imperfection in one of the balls.

7. The system of claim 1 comprising a variable geometry unit and circuitry to implement a test regimen by adjusting the variable geometry unit.

8. The system of claim 1 wherein the ball bearing assembly comprises:
an outer race that comprises an inner surface; and
an inner race that comprises an outer surface that comprises the imperfection and a shoulder disposed at a shoulder angle wherein the imperfection is disposed at an angle in a range from about 50% of the shoulder angle to about 100% of the shoulder angle wherein the balls are disposed between the inner surface of the outer race and the outer surface of the inner race.

9. The system of claim 1 wherein the ball bearing assembly comprises an outer race that comprises an inner surface and an inner race that comprises an outer surface, wherein the imperfection comprises a deviation in the outer surface of the inner race and wherein the deviation comprises at least one member selected from a group consisting of a raised deviation and a recessed deviation.

10. The system of claim 1 wherein the ball bearing assembly comprises an outer race that comprises an inner surface and an inner race that comprises an outer surface and wherein the imperfection comprises surface roughness of the outer surface of the inner race.

11. The system of claim 1 wherein the ball bearing assembly comprises from about 5 to about 15 balls.

12. The system of claim 1 wherein the ball bearing assembly comprises a unitary outer race.

13. The system of claim 1 wherein the ball bearing assembly comprises a turbine side inner race or a compressor side inner race.

14. The system of claim 1 wherein the ball bearing assembly comprises:
an outer race that comprises an inner surface;
a first inner race that comprises an outer surface that comprises an imperfection and a shoulder disposed at a shoulder angle wherein the imperfection is disposed at an angle in a range from about 50% of the shoulder angle to about 100% of the shoulder angle; and
a second inner race that comprises an outer surface that comprises an imperfection and a shoulder disposed at a shoulder angle wherein the imperfection is disposed at an angle in a range from about 50% of the shoulder angle to about 100% of the shoulder angle;
wherein the balls comprise a first set of balls disposed between the inner surface of the outer race and the outer surface of the first inner race; and
a second set of balls disposed between the inner surface of the outer race and the outer surface of the second inner race.

15. The system of claim 14 wherein, for a given rotational speed of the inner races, the imperfection of the first inner race generates a first frequency upon contact with the first set of balls and the imperfection of the second inner race generates a second frequency upon contact with the second set of balls.

16. The system of claim 15 wherein the first frequency differs from the second frequency.

* * * * *